United States Patent
Enomoto et al.

(10) Patent No.: US 7,712,362 B2
(45) Date of Patent: May 11, 2010

(54) LIQUID SURFACE DETECTION DEVICE

(75) Inventors: Kiyoshi Enomoto, Niigata (JP); Koichi Sato, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 148 days.

(21) Appl. No.: 11/922,483

(22) PCT Filed: Jun. 14, 2006

(86) PCT No.: PCT/JP2006/311909
§ 371 (c)(1),
(2), (4) Date: Dec. 19, 2007

(87) PCT Pub. No.: WO2007/004393
PCT Pub. Date: Jan. 11, 2007

(65) Prior Publication Data
US 2009/0126485 A1 May 21, 2009

(30) Foreign Application Priority Data
Jun. 30, 2005 (JP) .............................. 2005-191241

(51) Int. Cl.
*G01F 23/00* (2006.01)
(52) U.S. Cl. .................................. 73/290 R
(58) Field of Classification Search ............... 73/290 R, 73/305, 313, 314, 317
See application file for complete search history.

(56) References Cited

U.S. PATENT DOCUMENTS

| | | | | |
|---|---|---|---|---|
| 4,178,802 A | * | 12/1979 | Yamamoto | ................... 73/313 |
| 4,326,413 A | * | 4/1982 | Takeshita et al. | ............... 73/313 |
| 4,782,699 A | * | 11/1988 | Gonze | .......................... 73/308 |
| 5,408,418 A | * | 4/1995 | Lippmann et al. | ............. 702/53 |
| 5,483,109 A | * | 1/1996 | Gholston | ..................... 307/118 |
| 5,826,459 A | * | 10/1998 | Kataoka et al. | ........... 73/290 R |
| 6,427,533 B1 | * | 8/2002 | Yoshida | ........................ 73/291 |
| 6,644,115 B2 | * | 11/2003 | Cwik et al. | ................ 73/290 R |
| 2009/0056436 A1 | * | 3/2009 | Miceli et al. | ............... 73/290 R |

FOREIGN PATENT DOCUMENTS

| | | |
|---|---|---|
| JP | 3-93734 | 9/1991 |
| JP | 5-28936 | 4/1993 |
| JP | 5-89393 | 4/1993 |
| JP | 10-197314 | 7/1998 |
| JP | 11-258025 | 9/1999 |
| JP | 2002-214023 | 7/2002 |
| JP | 2004-20538 | 1/2004 |

\* cited by examiner

*Primary Examiner*—John Fitzgerald
(74) *Attorney, Agent, or Firm*—McDermott Will & Emery LLP

(57) ABSTRACT

The present invention provides a liquid surface detection device 1 in which corrosion is restrained even when liquid having conductivity is used so that a longer lifespan is achieved, including a liquid surface detection sensor 2 that outputs a signal indicating a variation in liquid level as a variation in resistance value by the sliding movement of a contact point 2a on an electrode connected to a resistor 2b, and a control unit 4 that controls supply and stops a supply of electric power to the liquid surface detection sensor 2 at predetermined intervals, in which a vehicle state determination unit that determines a state of a vehicle is provided and the control unit 4 controls the duration to stop the supply of electric power to the liquid surface detection sensor 2 when the vehicle state determination unit determines that the vehicle is in a traveling state.

7 Claims, 2 Drawing Sheets

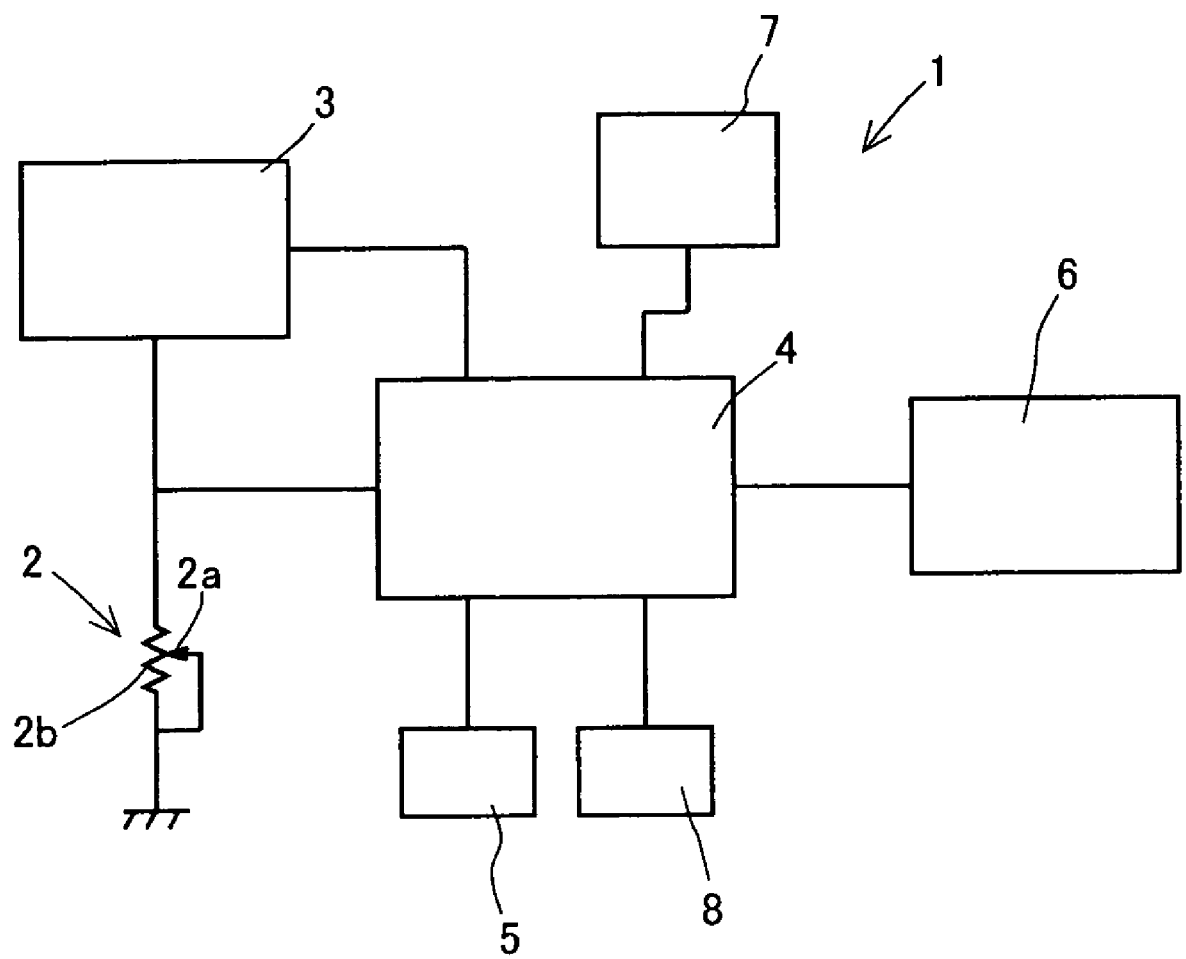

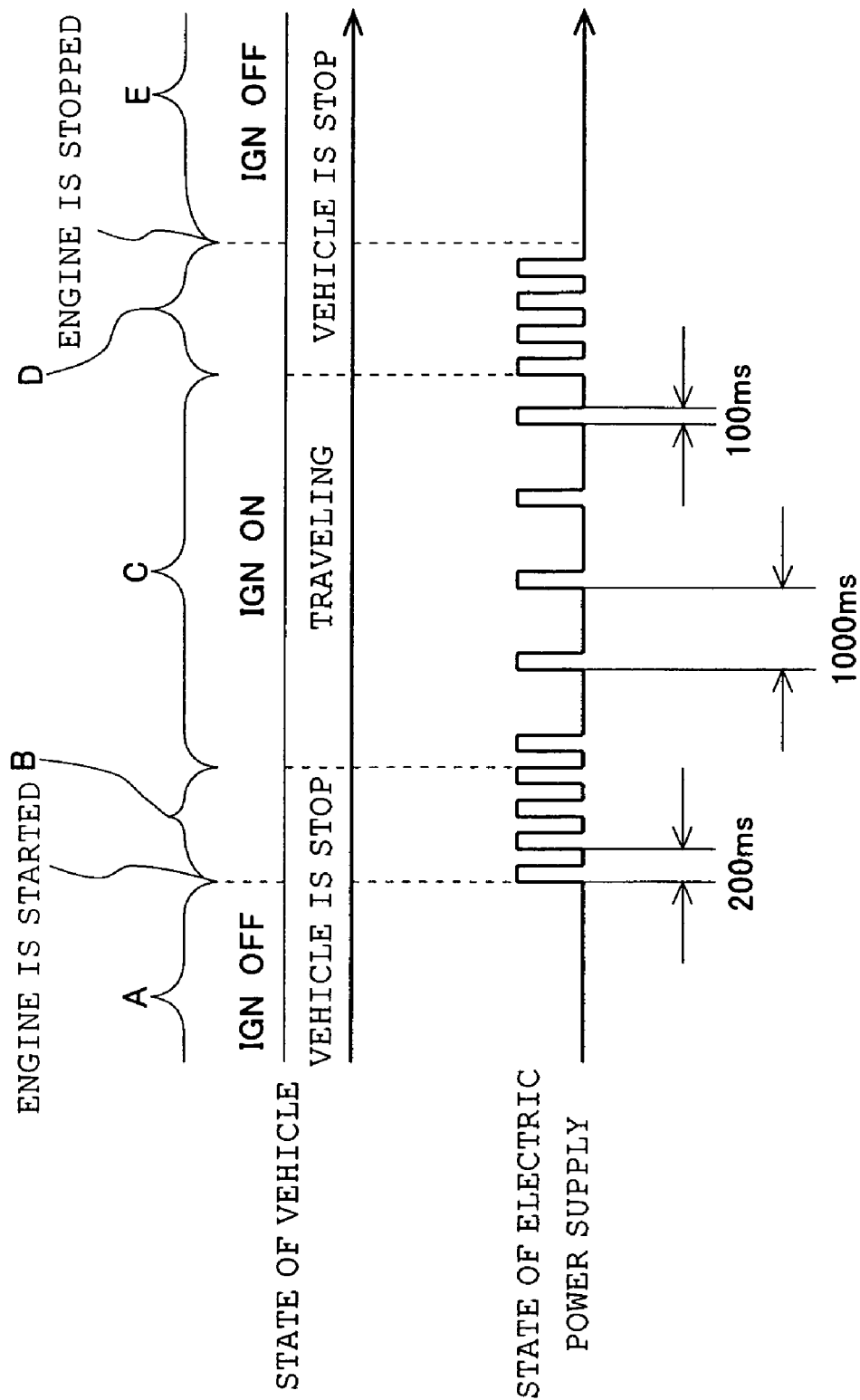

LIQUID SURFACE DETECTION DEVICE

RELATED APPLICATIONS

This application is the U.S. National Phase under 35 U.S.C. §371 of International Application No. PCT/JP2006/311909, filed on Jun. 14, 2006, which in turn claims the benefit of Japanese Application No. 2005-191241, filed on Jun. 30, 2005, the disclosures of which Applications are incorporated by reference herein.

TECHNICAL FIELD

The present invention relates to a liquid surface detection device having a liquid surface detection sensor to be disposed in liquid and, more specifically, to a liquid surface detection device which can be used for liquid having conductivity such as alcohol, water, and so on.

BACKGROUND ART

Liquid surface detection devices in the related art include a float arm provided with a float which floats on the liquid surface, a frame for rotatably supporting the float arm, a resistor provided on a substrate which is fixed to the frame, and a contact point which slides on electrodes connected to the resistor in association with the float arm, and detect the position of the liquid surface by detecting electric resistance between the ends of the contact point and the resistor (for example, see Patent Document 1)

Patent Document 1: JP 2004-20538 A

DISCLOSURE OF INVENTION

The liquid surface detection device as described above is normally provided in a fuel tank, and the contact point and the electrodes are exposed and hence are in contact with liquid such as fuel in the fuel tank. In a case where the liquid is liquid fuel such as alcohol having conductivity, the difference in potential occurs between the contact point and the electrodes due to a decrease in the voltage upon passage of the electric current through the contact point and the electrodes. Therefore, when the liquid fuel has conductivity, there is a problem such that a metal which constitutes the contact point and the electrodes corrodes due to electrolysis in the case of the direct electric current and hence the lifespan of the liquid surface detection device is significantly shortened.

Therefore, in view of the problem described above, the objective of the present invention is to provide a liquid surface detection device in which corrosion is restrained even when liquid having conductivity is used so that a longer lifespan is achieved.

SUMMARY OF THE INVENTION

In accordance with this invention, a liquid surface detection device is provided which includes a liquid surface detection sensor that outputs a signal indicating a change in liquid level as a resistance value changes by sliding movement of a contact point on an electrode connected to a resistor, and a control unit that controls supply and stops a supply of electric power to the liquid surface detection sensor at predetermined intervals, in which a vehicle state determination unit that determines a state of a vehicle is provided and the control unit control the duration to stop the supply of electric power to the liquid surface detection sensor to a length longer than the predetermined duration when the vehicle state determination unit determines that the vehicle is in a traveling state.

The vehicle state determination unit determines that the vehicle is in the traveling state in response to a vehicle speed signal that is received by the vehicle state determination unit from a vehicle speed sensor.

The vehicle state determination unit determines that the vehicle is in the traveling state by the amount of fuel injection equal to or more than a predetermined amount that is injected per unit time.

The vehicle state determination unit determines that the vehicle is in the traveling state when the number of revolution of an engine reaches a predetermined number.

The control unit corresponds to the vehicle state determination unit.

The present invention provides a liquid surface detection device which is able to restrain corrosion to achieve a longer lifespan of the liquid surface detection device even when the liquid surface detection device is used in liquid having conductivity.

BRIEF DESCRIPTION OF THE DRAWINGS

FIG. 1 is an electric block diagram showing a liquid surface detection device in accordance with to a first embodiment of the present invention.

FIG. 2 is a diagram showing a state of electric power supply to the liquid surface detection device.

DESCRIPTION OF THE REFERENCE NUMERALS AND SIGNS 1 liquid surface detection device
2 liquid surface detection sensor
2a contact point
2b resistor
3 power supply unit
4 control unit
5 vehicle speed sensor
6 indicator
7 fuel injection device
8 engine revolution detection sensor

DETAILED DESCRIPTION OF THE INVENTION

The present invention provides a liquid surface detection device 1 including a liquid surface detection sensor 2 that outputs a signal indicating a change in liquid level as a resistance value changes by sliding movement of a contact point 2a on an electrode connected to a resistor 2b, and a control unit 4 that controls supply and stops a supply of electric power to the liquid surface detection sensor 2 at predetermined intervals, in which a vehicle state determination unit that determines the state of a vehicle is provided, and the control unit 4 controls the duration to stop the supply of electric power to the liquid surface detection sensor 2 to a duration longer than the predetermined intervals when the vehicle state determination unit determines that the vehicle is in a traveling state. According to this configuration, a liquid surface detection device that is able to restrain corrosion, even when liquid having conductivity is used, to expand a lifespan of the liquid surface detection device.

The vehicle state determination unit receives a vehicle speed signal from a vehicle speed sensor 5 and determines that the vehicle is in the traveling state. According to this configuration, a liquid surface detection device that is able to restrain corrosion, even when liquid having conductivity is used, to expand a lifespan of the liquid surface detection device.

The vehicle state determination unit determines that the vehicle is in the traveling state by the amount of fuel injection equal to or more than a predetermined amount that is injected per unit time. According to this configuration, a liquid surface detection device that is able to restrain corrosion, even when liquid having conductivity is used, to expand a lifespan of the liquid surface detection device.

The vehicle state determination unit determines that the vehicle is in the traveling state when the number of revolution of an engine reaches a predetermined number. According to this configuration, a liquid surface detection device that is able to restrain corrosion, even when liquid having conductivity is used, to expand a lifespan of the liquid surface detection device.

The control unit 4 corresponds to the vehicle state determination unit. According to this configuration, a liquid surface detection device that is able to restrain corrosion, even when liquid having conductivity is used, to expand the lifespan of a liquid surface detection device.

FIRST EMBODIMENT

Referring now to the attached drawings, the first embodiment of the present invention is described below, in accordance with the attached drawings.

FIG. 1 is an electric block diagram showing the liquid surface detection device 1 of the present invention, which includes the liquid surface detection sensor 2, a power supply unit 3, the control unit 4, the vehicle speed sensor 5 for detecting the speed of the vehicle, and an indicator 6. Reference numeral 7 designates a fuel injection device for supplying fuel to the engine of the vehicle, and reference numeral 8 designates an engine revolution detection sensor for detecting the number of revolution of the engine.

The liquid surface detection sensor 2 is fixed to the interior of a fuel tank (not shown). The liquid surface detection sensor 2 includes the contact point 2a and a substrate (not shown) having electrodes and the resistor 2b. The contact point 2a slides on the electrodes in association with a movement of a float (not shown) floating on the liquid surface of the liquid fuel in the tank. The material of the contact point 2 is white metal (white silver), for example.

Pluralities of electrodes are formed of alloy of silver and palladium, and are elongated and independent from each other, and the resistor 2b is provided so as to straddle the electrodes. The liquid surface detection sensor 2 outputs the resistance value corresponding to an electrode that the contact point 2a is in contact with as a signal, which is obtained when the contact point 2a slides on the electrodes.

The power supply unit 3 does not always supply electric power to the liquid surface detection sensor 2. As shown in FIG. 2, it supplies electric power to the liquid surface detection sensor 2 for a predetermined time, and stops the supply of electric power for a predetermined time under the control of the control unit 4. The predetermined time for supplying electric power corresponds to a period from a rising point to a falling point of a square wave in the state of being supplied with electric power in FIG. 2. In this embodiment, the predetermined time is 100 millisecond (msec) and electric power is supplied to the liquid surface detection sensor 2 for the 100 msec.

The control unit 4, being composed of a Central Processing Unit or the like, receives signals from the sensors such as the liquid surface detection sensor 2 and the vehicle speed sensor 5, calculates the measured values from these signals, and indicates the same on the indicator 6. The control unit 4 also has a function as the vehicle state determination unit for determining the state of the vehicle according to the state of the vehicle and a function of controlling the power supply unit 3.

The vehicle speed sensor 5 is adapted to detect the traveling speed of the vehicle. The detected signal is sent to the control unit 4.

The indicator 6 includes a liquid crystal display device and a needle meter, and displays information on the vehicle under the control of the control unit 4.

The fuel injection device 7 is a device for injecting fuel to the engine of the vehicle (not shown) and the amount of injection is fixed and controlled by the number of revolution or the amount of intake air of the engine of the vehicle. In this embodiment, the control unit 4 does not control the fuel injection device 7, and receives information in the form of a signal about the amount of fuel injection of the fuel injection device 7 as a signal.

The engine revolution detection sensor 8 is adapted to detect the number of revolution of a crankshaft of the engine of the vehicle (not shown) and the control unit 4 receives the detected value from the engine revolution detection sensor 8 as a signal.

In this configuration, an operation of the liquid surface detection device in this example will be described referring to FIG. 2.

From a state A in FIG. 2 in which the vehicle is stopped with the engine of the vehicle stopped (ignition OFF, hereinafter, referred to as IGN OFF) to a state B in which the engine is started and hence the engine is in operation (ignition ON, hereinafter, referred to as IGN ON) but the vehicle is stopped, the control unit 4 drives the power supply unit 3, supplies electric power for 100 msec to the liquid surface detection sensor 2, and stops the power supply for the next 100 msec. The power supply to the liquid surface detection sensor 2 is carried out at 200 msec intervals. The reading of the signals from the liquid surface detection sensor 2 is carried out while electric power is supplied.

Subsequently, when the vehicle is in a state C in which the vehicle has started traveling, the control unit 4 as the vehicle state determination unit receives the vehicle speed signal from the vehicle speed sensor 5 and determines the state of the vehicle to be a state in which the vehicle is traveling. When the vehicle is in the state of traveling, it is unlikely that the vehicle is in a state in which fuel is being supplied. On the other hand, when the vehicle is stopped (the case in which the engine is stopped is also included as a matter of course), there is a case in which fuel is being supplied.

The variation in liquid level caused by the amount of consumption of fuel by the engine of the vehicle is gentler in comparison with that caused by the fuel supply. Therefore, when there is no fuel supply being carried out, it is not necessary to change the indication on the indicator 6 quickly with the variation in liquid level.

In a case where a quick indication is necessary other than the case of the fuel supply, there is a case of giving an indication initially when a power source (not shown) is turned from OFF to ON.

Therefore, the control unit 4 drives the power supply unit 3, and supplies electric power to the liquid surface detection sensor 2 for 100 msec, and stops the supply of electric power for the next 900 msec. In other words, the supply of electric power to the liquid surface detection sensor 2 is carried out at intervals of 1000 msec, which means that the duration that the power supply unit 3 stops the supply of electric power to the liquid surface detection sensor 2 during travel is longer than in comparison with the predetermined intervals in the state of B (when the vehicle is stopped). Therefore, the duration to supply electric power to the liquid surface detection sensor 2 can be reduced to a duration shorter than that in the state B, so that corrosion is restrained even when it is used for liquid having conductivity and, consequently, a longer lifespan of the liquid surface detection device is achieved.

Subsequently, when the vehicle has stopped traveling and is in a state D, the control unit 4, as the vehicle state determination unit, receives a signal of the speed from the vehicle speed sensor 5 and determines that the vehicle is in the stopped state (not traveling). When the vehicle is in the stopped state, there is a state in which fuel is being supplied, and hence the fuel level in the fuel tank may abruptly vary. Therefore, the control unit 4 drives the power supply unit 3, supplies electric power to the liquid surface detection sensor 2 for 100 msec, and stops the supply of electric power for the next 100 msec as in the case of the state B. In other words, the supply of electric power to the liquid surface detection sensor 2 is carried out at intervals of 200 msec as in the state B, so that a state which can cope with the abrupt variation in association with fuel supply or the like is maintained.

Subsequently, when the engine of the vehicle is stopped from the state D in FIG. 2, the ignition is turned OFF and the control unit 4 stops driving the power supply of unit 3, so that reading of the signal from the liquid surface detection sensor 2 is also stopped.

In this configuration, there is provided the liquid surface detection device in which the traveling state, which is a state in which the variation in fuel (liquid level) is small, is determined on the basis of the presence or absence of the vehicle speed and, when the variation of the fuel (liquid level) is small, the duration to stop the supply of electric power to the liquid surface detection sensor is elongated, so that the liquid surface detection device in which corrosion is restrained even when fuel (liquid) having conductivity is used so that a longer lifespan is achieved.

In the embodiment shown above, the traveling state, which is the vehicle state in which the variations in fuel (liquid level) is small, is determined by the presence or absence of the vehicle speed. However, the invention is not limited to the above-described embodiment. For example, it may be determined to be the traveling state, which is a vehicle state in which the variation in fuel (liquid level) is small, by the fact the amount of fuel injection from the fuel injection device 7 reaches an amount larger than the predetermined amount of fuel injection per unit time and, when the variation of the fuel (liquid level) is small, the liquid surface detection device in which corrosion is restrained even when fuel (liquid) having conductivity is used so that a longer lifespan is achieved by elongating the duration to stop the supply of electric power to the liquid surface detection sensor.

In the embodiment shown above, the traveling state, which is the state of the vehicle in which the variation in fuel (liquid level) is small, is determined by the presence or absence of the vehicle speed or the amount of fuel injection. However, the invention is not limited to the example. For example, it may be determined to be the traveling state, which is a vehicle state in which the variation in fuel (liquid level) is small, by the fact that the number of revolution of the engine reaches a predetermined number of revolution and, when the variation of the fuel (liquid level) is small, the liquid surface detection device in which corrosion is restrained even when fuel (liquid) having conductivity is used so that a longer lifespan is achieved by elongating the duration to stop the supply of electric power to the liquid surface detection sensor.

In the embodiment shown above, the duration to stop the supply of electric power in the states B and D (stopped state) is 100 msec, and the duration to stop the supply of electric power in the state of supplying electric power C (traveling state) is 900 msec. However, the respective durations to stop the supply of electric power are not limited to the embodiment shown above, and may be set as desired.

INDUSTRIAL APPLICABILITY

The present invention is applied to the liquid surface detection device for detecting the liquid level of liquid in the fuel tank.

What is claimed is:

1. A liquid surface detection device comprising:
    a liquid surface detection sensor configured to output a signal indicating a change in liquid level as a resistance value changes by sliding movement of a contact point on an electrode connected to a resistor; and
    a control unit configured to supply electric power to the liquid surface detection sensor at predetermined intervals; and
    a vehicle state determination unit configured to determine a state of a vehicle,
    wherein the control unit controls duration to stop the supply of electric power to the liquid surface detection sensor to a length longer than the predetermined duration when the vehicle state determination unit determines that the vehicle is in a traveling state.

2. The liquid surface detection device according to claim 1, wherein the vehicle state determination unit determines that the vehicle is in the traveling state in response to a vehicle speed signal that is received by the vehicle state determination unit from a vehicle speed sensor.

3. The liquid surface detection device according to claim 1, wherein the vehicle state determination unit determines that the vehicle is in the traveling state by the amount of fuel injection equal to or more than a predetermined amount that is injected per unit time.

4. The liquid surface detection device according to claim 1, wherein the vehicle state determination unit determines that the vehicle is in the traveling state when the number of revolution of an engine reaches a predetermined number.

5. The liquid surface detection device according to any one of claims 1 to 4, wherein the control unit corresponds to the vehicle state determination unit.

6. The liquid surface detection device according to claim 1, wherein the liquid surface detection device is configured to detect the liquid level of a conductive liquid.

7. The liquid surface detection device according to claim 6, wherein the conductive liquid comprises alcoholic.

* * * * *